United States Patent [19]
Hasui

[11] 3,898,418
[45] Aug. 5, 1975

[54] METHOD OF WELDING METALS UNDER WATER

[75] Inventor: Atsushi Hasui, Tokyo, Japan

[73] Assignee: National Research Institute for Metals, Tokyo, Japan

[22] Filed: Dec. 7, 1973

[21] Appl. No.: 422,964

Related U.S. Application Data

[63] Continuation-in-part of Ser. No. 233,635, March 10, 1972, abandoned.

[52] U.S. Cl. ............................... 219/121 P; 219/72
[51] Int. Cl. .............................................. B23k 5/00
[58] Field of Search ............. 219/121 P, 74, 75, 72, 219/137; 313/231; 61/69 R

[56] References Cited
UNITED STATES PATENTS

| 2,906,858 | 9/1959 | Morton, Jr. | 219/121 P |
| 3,204,076 | 8/1965 | Browning | 219/121 P X |
| 3,534,388 | 10/1970 | Ito et al. | 219/121 P |
| 3,632,950 | 1/1972 | Berghof | 219/72 |
| 3,692,973 | 9/1972 | Oku et al. | 219/121 P |

*Primary Examiner*—J. V. Truhe
*Assistant Examiner*—G. R. Peterson
*Attorney, Agent, or Firm*—Sherman & Shalloway

[57] ABSTRACT

The underwater welding of metal surfaces using a plasma arc, wherein the plasma arc, plasma gas and weld part are sealed with a layer of water glass.

7 Claims, 11 Drawing Figures

PATENTED AUG 5 1975

SHEET 1

3,898,418

Fig. 2-a
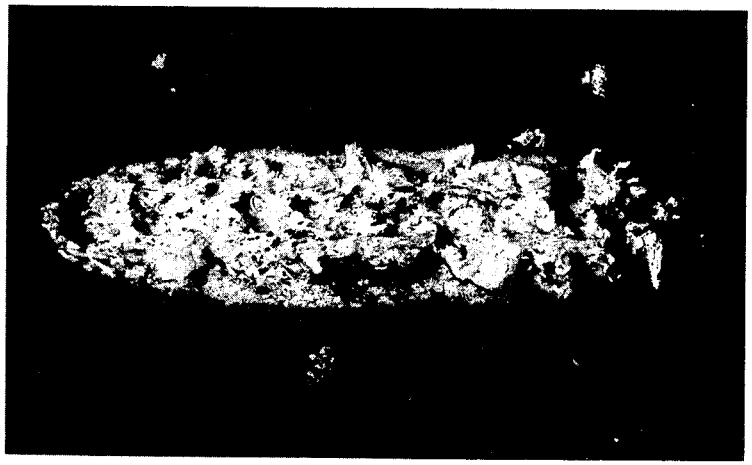
Fig. 2-b
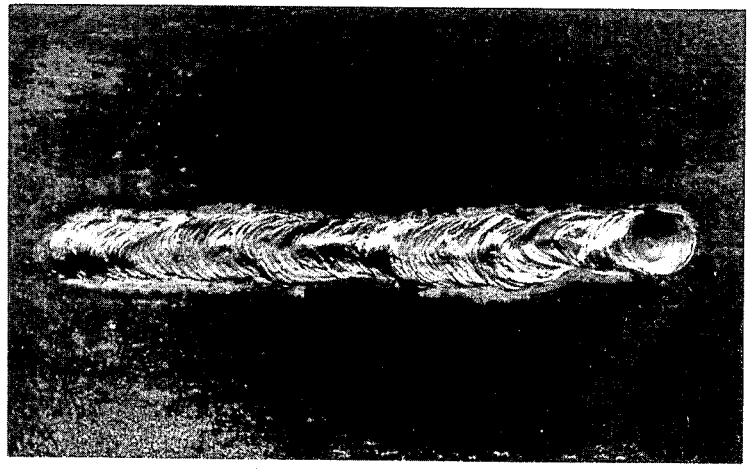

Fig. 3-a
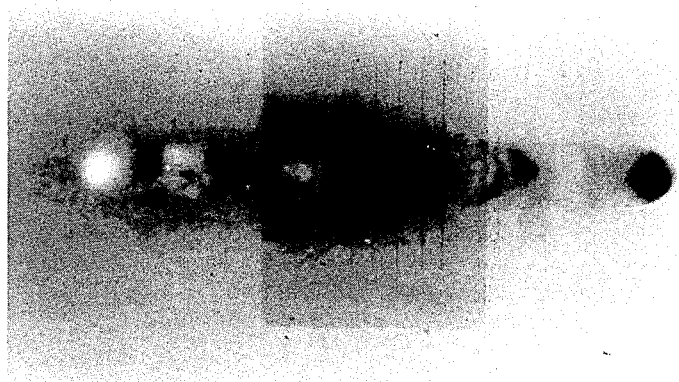
Fig. 3-b
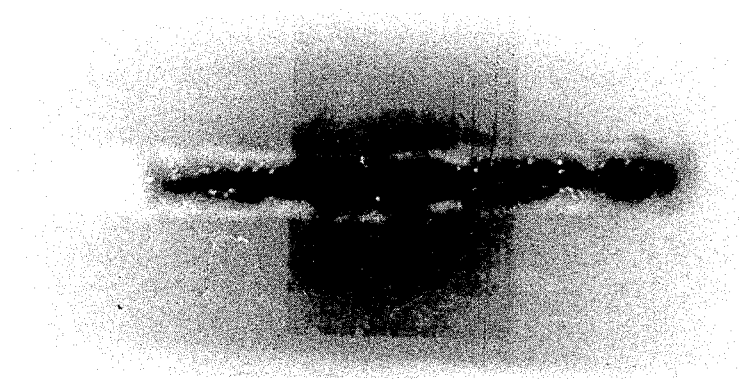

Fig. 4-a
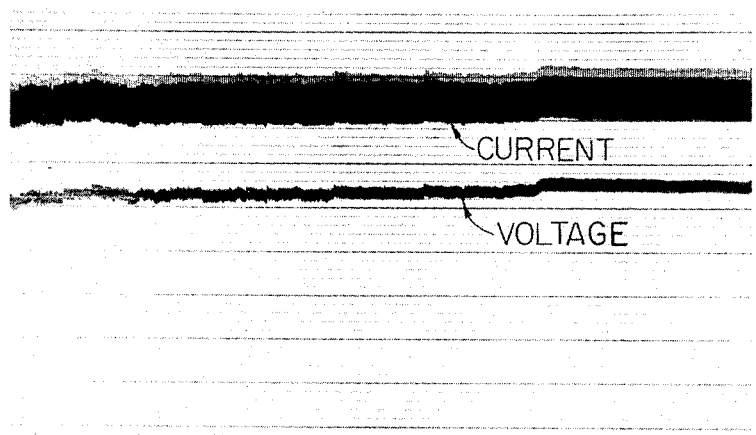
Fig. 4-b
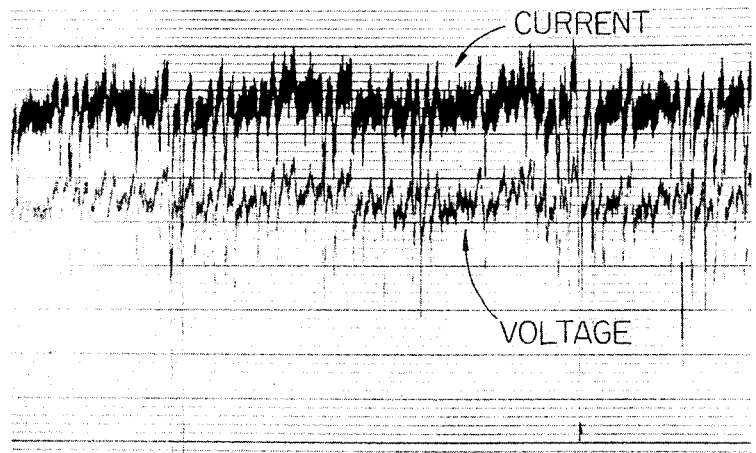

3,898,418

METHOD OF WELDING METALS UNDER WATER

This application is a continuation-in-part application of U.S. Ser. No. 233,635 filed Mar. 10, 1972, now abandoned.

This invention relates to a method of welding metals under water by the plasma-arc welding process. In particular, the invention relates to an underwater welding method wherein the welding is performed while shielding an arc-covering gas from water using water glass.

Underwater welding has gained an increasing acceptance in the field of ocean exploitation and various other related industrial fields. The conventional underwater welding method relies on manual welding using a coated electrode, in which the flux in the electrode is decomposed or gasified by the heat of the arc, and the weld parts and the arc are covered with the resulting gas to stabilize the welding operation.

In the conventional method using a coated electrode, the generation of arc is performed by contacting the end of the electrode with the workpiece, i.e., base metal, to produce flash, and in a moment, withdrawing the end of the electrode from the workpiece by a suitable distance, and maintaining the arc. In this method, it often happens that the end of the electrode fuses to the surface of the workpiece when the electrode has momentarily departed from the workpiece, making it impossible to generate arc. Even if arc can be produced, the generation of arc is unstable, and the distance between the workpiece and the electrode should be maintained small, which will entail an extremely poor welding efficiency. Furthermore, since the welded parts are rapidly cooled by water which surrounds the surface of the workpiece, the molten metal at the time of welding solidifies within a very short period of time. Accordingly, sufficient welding cannot be performed, and the weld metal containing many blowholes results, which leads to a tendency toward the formation of deep undercuts in the interface between the weld metal and the workpiece. Furthermore, the welded metal surface has considerable undulations, and a poor appearance. In addition to the above-mentioned defects, the underwater welding method suffers from the difficulty of welding operation owing to the turbidity of water which is caused by the occurrence of finely divided powders of the welding metal near the place of welding.

In an attempt to remove these defects of the welding method using a coated electrode, it was proposed to enclose the welding zone under water with a compressed gas, or to form a cavity by exclusion of water in the welding part and carry out the welding within the cavity so formed (Japanese Pat. Nos. 32139/70, and 32925/70). Even by these methods, the swaying of the cavity occurs by the movement of water, and the molten metal cannot be solidified stably, but blowholes are formed in the weld metal.

Accordingly, an object of this invention is to provide a method of welding metals under water, wherein the weld metal is solidified stably, and a welded part free from blowholes can be obtained.

Another object of this invention is to provide a method of welding metals under water, whereby it is possible to obtain welded metal free from undercuts which has good appearance and high tensile strength and impact strength.

The above objects of this invention can be achieved by a method of welding metal surfaces under water which comprises welding the surfaces by generating a plasma arc between the metal surfaces under water and an electrode of a plasma torch located opposite to the metal surfaces, and covering the weld zone of the metal surfaces and the arc with a compressed gas jetted out from the forward end of the plasma torch thereby to form a layer of gas and weld the metal surfaces by the arc developed across the electrode and metal surfaces, the layer of gas being enclosed with a second layer of water glass.

One new aspect of this invention consists in sealing the plasma arc, plasma gas and weld part with a stream of water glass in the underwater welding using a plasma arc. The water glass to be used should have a viscosity of 10 to 1,000 centipoises, preferably 40 to 100 centipoises. Most suitably, it has a viscosity of 60 centipoises. The water glass may contain various arc stabilizers, such as calcium carbonate, potassium silicate, titanium oxide, or the finely divided particles of a gas-generating substance, for example starch or cellulose.

The stream of water glass for sealing the plasma arc and weld part from water in accordance with the method of this invention is solidified by the heat of the plasma gas to form a solid porous wall so that it covers the plasma arc, plasma gas, and that part of the base metal which is being welded. Accordingly, the method of this invention makes it possible to form a shield which is stable against swaying by the movement of the water. Thus, the arc is maintained totally stable, and a good weld free from blowholes can be obtained. The solidified water glass wall sticks to the base metal to cover a fairly wide range around the weld part of the base metal. Since this wall is porous and has low thermal conductivity, it prevents the weld part from being quenched by the surrounding water.

The invention will be described further by reference to the accompanying drawings in which:

FIG. 2 (a) is a photograph showing the state of the water glass wall stuck to the parent metal in accordance with the present invention;

FIG. 2 (b) is a photograph showing the weld part of the metal after removal of the water glass wall;

FIG. 3 is an X-ray photograph of the welded part obtained by the present invention (a) and the conventional method (b);

FIG. 4 is an oscillogram showing the current and voltage characteristics during the underwater plasma-arc welding of the method of the present invention (a) and the conventional method (b);

Figure 1:
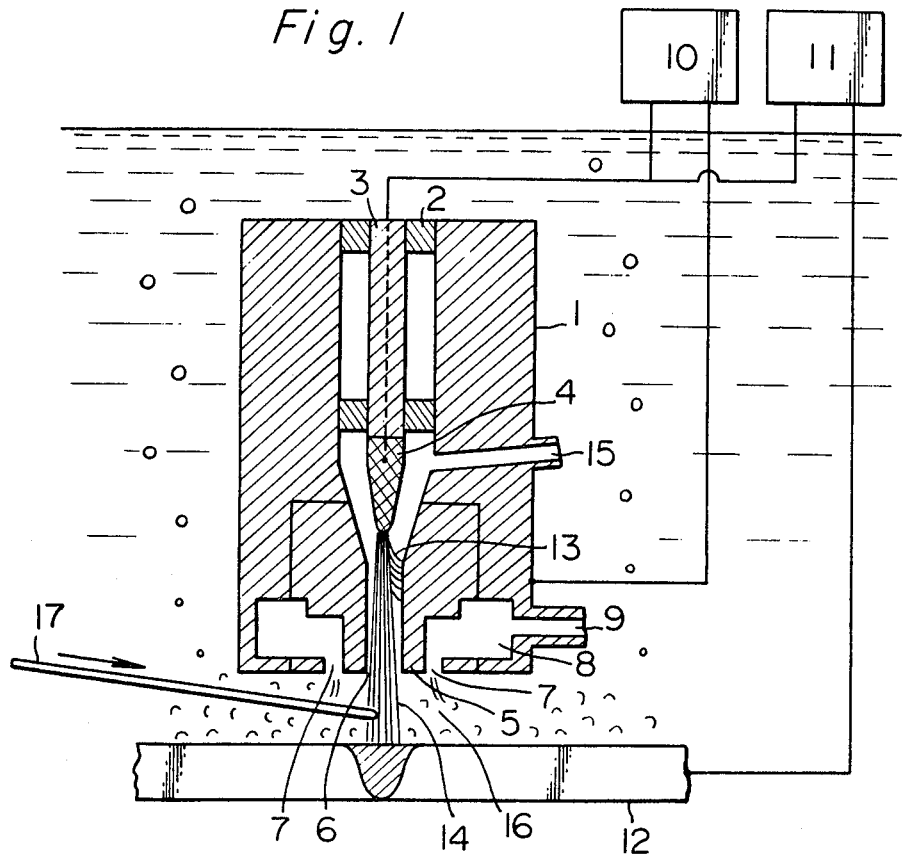
FIG. 1 is an explanatory view showing an example of the underwater plasma-arc welding in accordance with the present invention.

Referring to FIG. 1, a cathode support 3 is held to the main body of a plasma torch 1 by an insulator 2. A tungsten cathode 4 containing tungsten or thorium is secured to the forward end of the cathode support 3. A copper nozzle anode 5 is fitted in the main body of the torch 1 in a fixed condition. An operating gas jet opening 6 is provided at the central part of the anode 5. Around the gas jetting opening 6 is provided an annular slit 7 for flowing water glass, which slit communicates with a pool 8 and an inlet 9. The tungsten cathode 4 is positioned at a certain distance from the inlet of the opening 6. It is connected to the negative electrode of a power source 10 for a subsidiary arc and to the negative electrode of a power source 11 for a plasma-arc, and a subsidiary arc 13 is generated between the tungsten cathode 4 and the copper nozzle anode 5 connected to the positive electrode of the power source 10 for the subsidiary arc. Then, a plasma-arc 14 is generated between the cathode 4 and a base metal 12 connected to the positive electrode of the power source 11 for the plasma-arc. As soon as the subsidiary arc is generated, the plasma gas is fed from a gas inlet 15 and acts on the subsidiary arc generated between the tungsten cathode 4 and the copper nozzle anode 5, whereby it becomes a plasma jet and is jetted from the gas jetting opening 6. The water glass flowing from the annular slit 7 shields the plasma arc from the surrounding water.

On the other hand, water glass 16 is fed from the inlet 9, so that it flows from the annular slit 7 of the plasma torch 1 and surrounds the plasma-arc generating portion under water. A stream of the water glass is heated by the heat of the plasma gas to form a solid porous wall. Hence, an effective cavity is formed within the water glass 16 flowing from the annular slit 7. The plasma is maintained stable in this cavity, and becomes a heat source for welding. As shown in FIG. 1, a filler metal 17 may or may not be fed to the weld zone. According to this welding process, the plasma and molten metal are completely shielded from the ambient water by means of the wall of the solidified water glass. Since the swaying of the cavity formed within the wall of the solidified water glass is little, welding is performed stably, and the weld part is prevented from being rapidly cooled with water. The weld joint obtained is clean in appearance and free from undercuts and blowholes.

The following table will illustrate that the rapid cooling of the weld part can be prevented by the viscous liquid.

The X-ray photograph of FIG. 3 demonstrates that the weld part (photograph (a)) in accordance with this invention not only has a good outer appearance, but also is free from interior defects such as blowholes, whereas the weld part obtained by the conventional method (photograph b) has a number of blowholes and other defects.

It is seen from the oscillogram of FIG. 4 that the plasma arc (oscillogram a) of welding in accordance with the present invention is very stable compared with the conventional method (oscillogram b).

The plasma-arc welding under water, however, encounters one difficulty at the time of initiation. When the flow rate of a plasma gas to be jetted out at the time of initiation is equal to, or smaller than, that in the steady state, it is difficult to transfer the subsidiary arc 13 generated between the tungsten cathode 4 and the copper nozzle anode 5 to the positively charged base metal 12 as the stable plasma-arc. In other words, it is difficult to generate a stable plasma-arc 14 between the cathode 4 and the base metal 12. This is especially so when the distance between the forward end of the torch and the base metal is large. With some shape of the base metal, the torch, sometimes, cannot be sufficiently brought near that part of the base metal to be welded. Even when it can be made to approach the weld part, too much approach involves danger.

The above difficulty can be overcome by rendering the flow rate of the plasma gas at the time of initiating the welding greater than that in the steady state, and as a result, a stable initiation of welding can be performed while the distance between the forward end of the torch and the base metal is adjusted to an extent sufficient for safety. Immediately after the initiation of welding, the flow rate of a plasma gas is decreased to that in the steady state, and the base metal is melted by a plasma arc generated at the positively charged workpiece from the tungsten cathode.

The flow rate of the plasma gas in the steady state is determined according to the diameter of the jet opening of the torch, the input of plasma-arc, the distance between the torch end and the base metal, and the depth of water.

Effect of the Shielding on the Cooling Rate

| Shielding (l/min.) | Cooling time (sec.) 800–500°C | Cooling time (sec.) 800–300°C | Cooling rate at 500°C (°C/sec.) | Weld input |
|---|---|---|---|---|
| A None | 3.5 | 5.9 | 100 | $4.2 \times 10^4$ |
| B Ar, 40 | 3.1 | 5.2 | 96 | $3.9 \times 10^4$ |
| C W, G, 0.6* | 6.5 | 11.2 | 44 | $3.8 \times 10^4$ |

Note : Welding conditions :
Subsidiary arc current : 100 Amp
Plasma arc current : 150 Amp
Welding speed : 10 cm/min
Plasma gas : Ar, 2 l/min
Packing plate : none
*Water glass viscosity : 60 cp
Thickness of base metal : 12 mm It is seen from FIG. 2 (a) that the flow of the water glass is solidified and sticks to the base metal so as to cover a fairly wide range around the weld part. Furthermore, from the photograph of FIG. 2 (b), the weld part obtained by the method of this invention has very good outer appearance.

Usually, the flow rate of the plasma gas in the steady state is 2 liters/min. to 5 liters/min.

Figure 5:
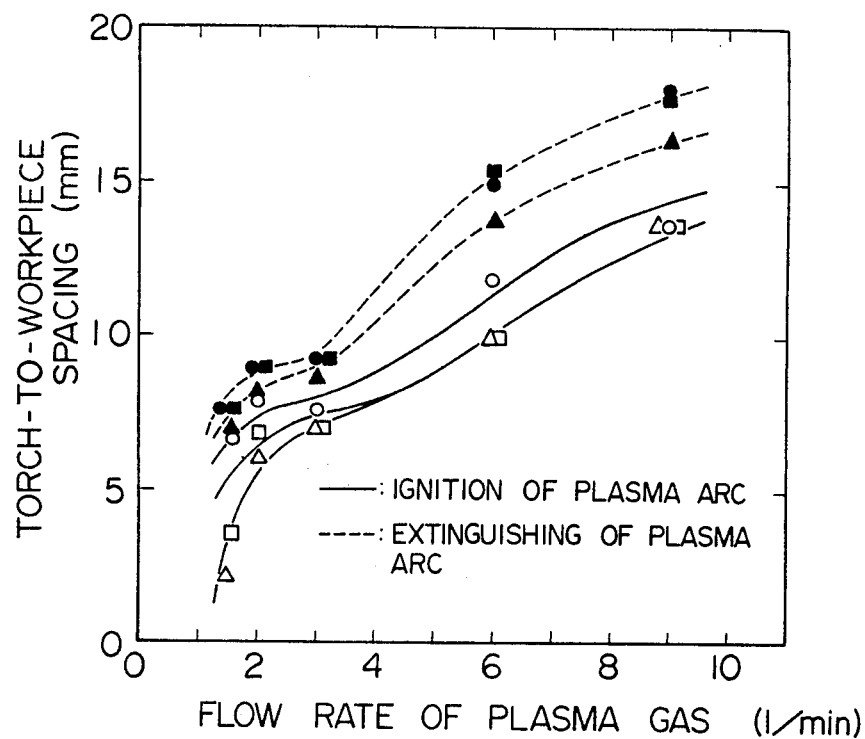
FIG. 5 is a graphic representation showing a relation between the torch-to-metal spacing and the flow rate of plasma gas.

It is seen from FIG. 5 that at the initiation of generating plasma jet under water, the ignition of a plasma-arc between the cathode of the torch and the workpiece becomes effective by an increase in the flow rate of the plasma gas. FIG. 5 represents a curve showing the flow rate of the plasma gas which induces the ignition of the plasma-arc and a curve showing the flow rate of the plasma gas which leads to the extinguishing of the plasma-arc, both plotted against the spacing between the forward end of the torch and the workpiece. This experiment was conducted under conditions such that the plasma-arc input was 5.8 – 6.6 KW, the plasma-arc current was 150 A, and no shielding liquid was used.

Figure 6:
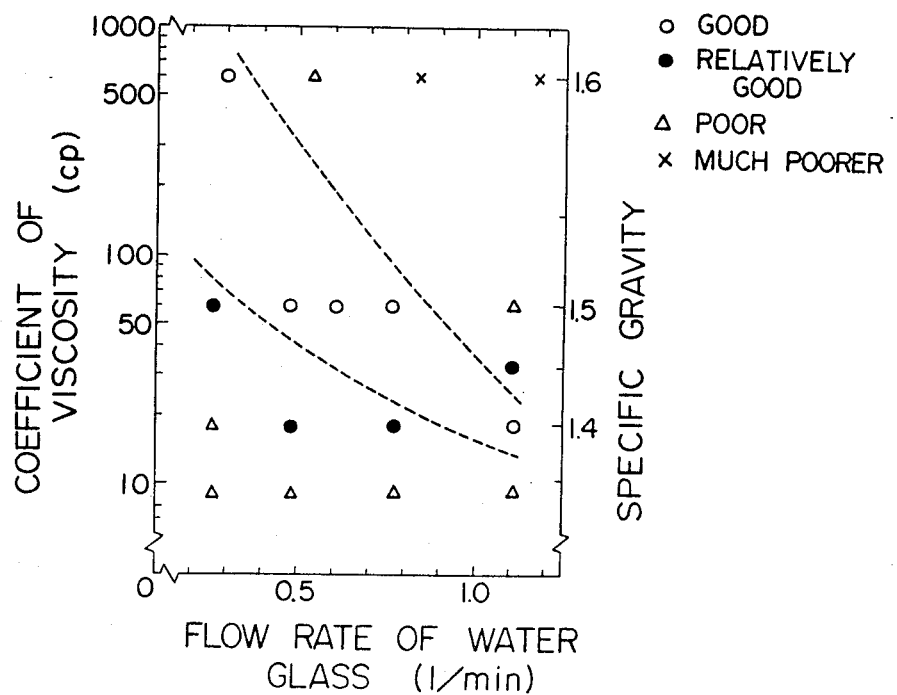
FIG. 6 is a graphic representation showing the effect of the viscosity of the water glass on the underwater plasma arc welding.

The viscosity of the water glass used in the present invention needs to be from 10 cps to 1,000 cps. The flow rate of the water glass stream should be 0.2 liter/min. to 1.2 liter.min., preferably 0.5 liter/min. to 0.8 liter/min. FIG. 6 shows the results of underwater plasma-arc welding which was performed using water glass of varying viscosities. The conditions for the plasma-arc welding, the results of which are shown in FIG. 6, are as follows:

| | |
|---|---|
| Flow rate of plasma gas | : 2 liters/min. |
| Subsidiary arc current | : 100 Amp. |
| Plasma-arc current | : 150 Amp. |
| Torch-to-base metal spacing | : 6 mm |
| Welding speed | : 10 cm/min. |

Argon gas or helium gas is preferred as the plasma gas.

Unless there is a shielding from water by the water glass, the plasma-arc under water is extremely constricted by the surrounding water and gains an energy of excessively high density. Furthermore, the cooling of molten metal and solidified metal becomes rapid to cause voids in the molten metal, and bring about undercuts in the weld.

In contrast, according to the present invention, the energy density of the plasma-arc is reduced by flowing the viscous liquid from the annular slit provided around the plasma jet opening 6 to provide a sufficient space between the work piece and the forward end of the jet opening. Thus, the diameter of the plasma-arc is increased, and the above-mentioned defects have been removed.

Figure 7:
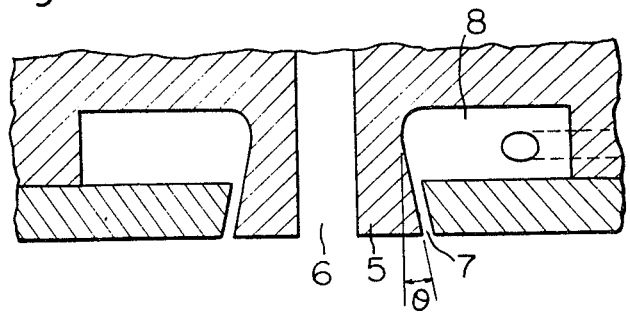
FIG. 7 is an explanatory view showing the angle of an annular projecting opening provided at the end of a torch used in the present invention.

The shielding effect is increased by providing the annular slit at an inclination to the central axis of the jet opening. The angle ($\theta$) of inclination is shown in FIG. 7. In order to maintain the shielding effect of the shielding water glass, the angle formed by the tangential direction of the annular slit 7 and the central axis of the plasma gas jet opening 6 is adjusted to a range of $-10°$ to $30°$. This angle is determined according to the water pressure and the conditions desired for constricting the arc. It is preferred that the outlet of the annular slit should be positioned several millimeters to 10 mm apart from the wall of the jet outlet.

The present invention will be specifically described with reference to the following Examples.

EXAMPLE 1

Welding of test pieces was carried out by a single pass using a plasma torch of the following shape and specification.

Cathode: Tungsten containing thorium
Diameter of cathode: 6.3 mm
Nozzle diameter: 5.5 mm
The inside diameter of the annular water glass flow outlet: 18 mm
Spacing of the outlet of the water glass flow outlet: 2 mm Angle ($\theta$): 20°

Using this plasma torch, a plasma jet was generated as a subsidiary arc current of 100 A, and a 6 mm-thick SM 41 steel base metal was positioned at a distance of 6 mm from the plasma torch. It was connected to a plasma-arc DC power source to generate plasma and perform underwater welding. The plasma-arc current was 150 A. The shielding water glass used was obtained by diluting water glass with water to a viscosity of 60 cp. The water glass was fed at a rate of 600 cc/min., and allowed to flow from the outlet for the water glass so as to shield the plasma-arc and the weld zone from the surrounding water.

The plasma-arc was ignited under the flow rate of plasma gas (argon) of 7.5 liters/min, and thereafter, the flow rate of plasma gas in the steady state was adjusted to 2 liters/min. Under these conditions, the underwater plasma-arc welding was performed.

Figure 8:
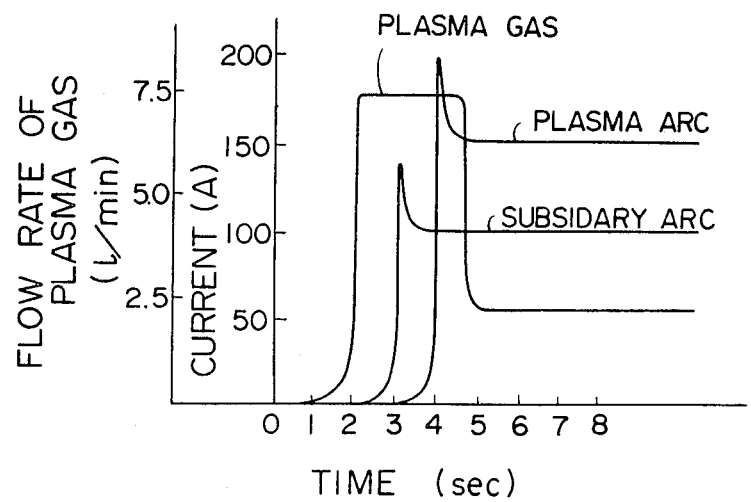
FIG. 8 is a graphic representation showing the plasma welding characteristics according to one embodiment of the present invention.

FIG. 8 shows the plasma-arc welding characteristics in accordance with the present Example, the axis of ordinates representing the flow rate of the plasma gas (liters/min) and the current values (A) of the subsidiary arc and plasma-arc, as plotted against the plasma jet initiation and the welding start point represented by the axis of abscissas.

FIG. 4 is an oscillogram showing the current and voltage characteristics of plasma-arc in the underwater welding operation in the case of the method of the present invention and of the conventional method. FIG. 4-$a$ shows the method of the present invention, in which plasma is maintained stably during welding, whereas FIG. 4-$b$ shows the plasma-arc welding in which a water glass is not used as a shielding, and indicates that current is markedly disturbed and the plasma is unstable.

FIG. 3 is an X-ray photograph of the weld which is obtained by underwater plasma arc welding. In FIG. 3-$a$ according to the method of the present invention, no defect such as the occurrence of blowholes in the weld metal is observed, whereas FIG. 3-$b$ shows that with the plasma welding without the shield of a water glass, a number of blowholes and other defects are observed in the weld metal.

The weld joint and the weld metal were tested as to mechanical properties. The welding conditions and the test results are given in Table 1-$a$, 1-$b$. and 1-$c$.

The test piece of the weld joint was prepared in accordance with the procedure of JIS Z-2201. The gauge length was adjusted to 50 mm. The test piece of the weld metal was prepared by providing a V-notch at the weld metal portion of the weld joint to a depth of 2 mm with an angle of 120°. The test piece used for testing the Charpy impact test of the weld joint had a size of $5 \times 5 \times 55$ mm with a V-notch of 0.5 mm depth provided in the weld metal portion. The test was conducted at 15°C.

Table 1-$a$

| Weld No. | Welding conditions | |
|---|---|---|
| | 1 | 2 |
| Shielding (l/min.) | W.G.,* 0.6 | None |
| No. of pass | Single pass | Single pass |
| Current (Amp) | 190 | 140 |
| Volt (V) | 40 | 45 |
| Weld speed (cm/min.) | 10 | 10 |
| Weld input (Joule/cm) × 10⁴ | 4.6 | 3.8 |
| Backing plate | Copper | Copper |
| Undercuts | None | None |
| Blowholes | None | None |

Note *W.G.: Water glass 60 cp.

Table 1-b

| Weld No. | Mechanical properties of Welds | | | Weld Metal | |
|---|---|---|---|---|---|
| | Weld Joint | | | | |
| | Ultimate Strength (kg/mm²) | Elongation (GL=90 mm) (%) | Location of fracture | Ultimate strength (kg/mm²) | Joint efficiency (%) |
| 1 | 46.1 | 22.6 | Base metal | 57.8 | 117 |
| 2 | 44.6 | 22.9 | Base metal | 57.4 | 116 |
| Base metal | 45.2 | 28.1 | | 49.6 | 100 |

Table 1-c

Results of Charpy impact tests

| Weld No. | Impact value (kg-m/cm²) |
|---|---|
| 1 | 4.4 (3.5 – 4.8) |
| 2 | 2.2 (2.0 – 2.5) |
| Base metal | 5.6 (5.4 – 5.7) |

It is seen from the above results that by the method of the present invention, the mechanical properties of the weld joint can be sufficiently maintained.

EXAMPLE 2

Example 1 was repeated except that welding was carried out by a two-pass process. The same test as in Example 1 was conducted on the welded test pieces. The results are shown in Tables 2-a, 2-b and 2-c.

Table 2-a

| Weld No. | Welding conditions | |
|---|---|---|
| | 3 | 4 |
| Shielding (l/min) | W.G., 0.6 | None |
| No. of pass | Two pass | Two pass |
| Current (Amp) | 150,145** | 135,120** |
| Volt (V) | 42, 42** | 44, 43** |
| Weld speed (cm/min) | 10 | 10 |
| Weld input (Joule/cm) × 10⁴ | 3.8, 3.7** | 3.6, 3.1** |
| Backing plate | None | None |
| Undercuts | None | None |
| Blowholes | None | None |

Note
*W.G.: Water glass 60 cp.
** : The first values show plasma arc current, voltage and weld input for the first pass, respectively.

Table 2-b

| Weld No. | Mechanical properties of Welds | | | Weld Metal | |
|---|---|---|---|---|---|
| | Weld Joint | | | | |
| | Ultimate strength (kg/mm²) | Elongation (GL=90 mm) (%) | Location of fracture | Ultimate strength (kg/mm²) | Joint efficiency (%) |
| 3 | 47.2 | 25.1 | Base metal | 53.0 | 107 |
| 4 | 45.9 | 24.5 | Base metal | 56.7 | 114 |
| Base metal | 45.2 | 28.1 | | 49.6 | 100 |

Table 2-c

Results of Charpy impact tests

| Weld No. | Impact value (kg-m/cm²) |
|---|---|
| 3 | 5.7 (4.8 – 6.9) |
| 4 | 1.8 (1.7 – 2.0) |
| Base metal | 5.6 (5.4 – 5.7) |

The above results demonstrate that by the method of the present invention, the mechanical properties of the weld joint can be sufficiently maintained.

What is claimed is:

1. A method of welding metal surfaces under water with a plasma torch located opposite to the weld zone of said metal surfaces to be welded comprising
   generating a plasma arc between the weld zone of said metal surfaces under water and a cathode of said plasma torch,
   jetting a layer of compressed plasma gas from the forward end of said plasma torch around said weld zone and said plasma arc to thereby enclose said weld zone and said plasma arc,
   enclosing said layer of compressed plasma gas with a layer of water glass and,
   welding said metal surfaces by the plasma arc developed across said electrode and said metal surfaces.

2. The method of claim 1 wherein the water glass has a viscosity of 10 to 1,000 centipoises and is flowed at a rate of 0.2 liter/min. to 1.2 liters/min. so as to surround the outer side of said layer of plasma gas.

3. The method of claim 1 wherein the plasma gas is jetted out at a flow rate of 2 to 6 liters per minute in the steady state, and at the initiation of the operation, is jetted out at a flow rate of at least 8 liters per minute.

4. The method of claim 1 which further comprises generating a subsidiary arc between said cathode and an anode of said plasma torch and jetting said compressed plasma gas across said subsidiary arc.

5. The method of claim 1 wherein said water glass includes an arc stabilizer selected from the group consisting of calcium carbonate, potassium silicate, and titanium oxide.

6. The method of claim 1 wherein said water glass further contains finely divided particles of a gas-generating substance selected from starch or cellulose.

7. The method of claim 1 wherein said layer of water glass is heated by the heat of said plasma gas to form a solid porous wall to thereby completely shield the plasma arc and welding zone from the surrounding water.

* * * * *